United States Patent
McNichols

(10) Patent No.: US 11,083,290 B2
(45) Date of Patent: Aug. 10, 2021

(54) ROLLING STORAGE RACK FOR A CLOSET

(71) Applicant: Jeanne McNichols, Charlotte, NC (US)

(72) Inventor: Jeanne McNichols, Charlotte, NC (US)

(*) Notice: Subject to any disclaimer, the term of this patent is extended or adjusted under 35 U.S.C. 154(b) by 0 days.

(21) Appl. No.: 16/904,704

(22) Filed: Jun. 18, 2020

(65) Prior Publication Data
US 2020/0397139 A1 Dec. 24, 2020

Related U.S. Application Data

(60) Provisional application No. 62/863,183, filed on Jun. 18, 2019.

(51) Int. Cl.
| | |
|---|---|
| *A47B 61/02* | (2006.01) |
| *A47B 61/04* | (2006.01) |
| *B62B 3/00* | (2006.01) |
| *B62B 5/06* | (2006.01) |
| *B62B 3/10* | (2006.01) |
| *A43D 117/00* | (2006.01) |

(52) U.S. Cl.
CPC ............ *A47B 61/02* (2013.01); *A43D 117/00* (2013.01); *A47B 61/04* (2013.01); *B62B 3/004* (2013.01); *B62B 3/005* (2013.01); *B62B 3/10* (2013.01); *B62B 5/06* (2013.01); *B62B 2202/65* (2013.01)

(58) Field of Classification Search
CPC ......... A47B 61/02; A47B 61/04; A47B 88/41; A47B 77/10; A47B 53/02; B62B 3/004; B62B 3/005; B62B 5/06; B62B 3/10; B62B 2202/65; B62B 5/0063; A47G 25/005; A47F 7/08; A47F 7/24; A47F 7/26; A43D 117/00
See application file for complete search history.

(56) References Cited

U.S. PATENT DOCUMENTS

| | | | | |
|---|---|---|---|---|
| 870,993 | A * | 11/1907 | Richardson | A47B 61/04 211/36 |
| 1,278,332 | A * | 9/1918 | Green | A47F 7/08 211/36 |
| 1,419,250 | A * | 6/1922 | Glidden | A43D 117/00 108/181 |
| 2,166,704 | A * | 7/1939 | Foulkes | A47F 10/00 312/199 |
| 2,204,502 | A | 6/1940 | Krauss | |
| 2,685,491 | A | 8/1954 | Bulow | |
| 2,901,124 | A * | 8/1959 | Gingher | A47B 43/00 108/29 |
| 4,026,616 | A * | 5/1977 | Kuehl | A47B 77/02 312/249.9 |
| 4,139,248 | A * | 2/1979 | Hornbacher | B42F 15/063 211/125 |
| 4,251,124 | A | 2/1981 | Emanual | |

(Continued)

*Primary Examiner* — Ko H Chan

(74) *Attorney, Agent, or Firm* — Jeffrey C. Watson; Mathew L. Grell; Grell & Watson Patent Attorneys LLC

(57) ABSTRACT

A rolling storage rack for a closet includes a base storage cart and base tracking. The base storage cart has a front, a back, sides that are open, and wheels attached to a bottom of the base storage cart at approximately each corner on the bottom of the base storage cart. The base tracking is configured to be mounted on a floor of the closet. The base tracking is configured to allow at least rear wheels of the wheels of the base storage cart to roll on top of the base tracking from a stored position in the closet to an access position pulled out from the closet.

9 Claims, 10 Drawing Sheets

(56) References Cited

U.S. PATENT DOCUMENTS

| | | | | |
|---|---|---|---|---|
| 4,417,524 | A * | 11/1983 | Quinn | A47B 53/02 |
| | | | | 104/287 |
| 4,789,210 | A | 12/1988 | Weiss et al. | |
| 4,807,765 | A * | 2/1989 | Brown | A47B 53/00 |
| | | | | 211/162 |
| 4,911,507 | A * | 3/1990 | Leist | A47B 53/02 |
| | | | | 312/201 |
| 5,076,442 | A | 12/1991 | Hakeem | |
| 5,305,890 | A | 4/1994 | Ishikawa | |
| 5,597,217 | A | 1/1997 | Hoska et al. | |
| 5,651,469 | A | 7/1997 | Lodge | |
| 5,683,155 | A * | 11/1997 | Sarno | A47B 53/00 |
| | | | | 312/198 |
| 6,036,286 | A * | 3/2000 | Krumholz | A47B 88/42 |
| | | | | 211/162 |
| 6,098,815 | A | 8/2000 | Nesser | |
| 6,112,917 | A | 9/2000 | Baker et al. | |
| 6,126,131 | A * | 10/2000 | Tietz | B25H 3/00 |
| | | | | 108/55.3 |
| 6,231,138 | B1 * | 5/2001 | Janson | A47B 53/02 |
| | | | | 312/201 |
| 6,247,769 | B1 | 6/2001 | Spitzer et al. | |
| 6,253,976 | B1 * | 7/2001 | Coleman | B60R 9/00 |
| | | | | 224/281 |
| 6,460,950 | B2 | 10/2002 | Spitzer et al. | |
| 6,776,297 | B2 | 8/2004 | Eustace | |
| 7,124,902 | B1 | 10/2006 | Chen | |
| 7,484,631 | B2 | 2/2009 | Bothun et al. | |
| 7,506,773 | B2 * | 3/2009 | Welsch | A47B 53/02 |
| | | | | 211/162 |
| 7,540,510 | B2 | 6/2009 | Sparkowski | |
| 7,587,983 | B2 | 9/2009 | Parker et al. | |
| 7,775,410 | B2 * | 8/2010 | Zamzow | A47G 25/005 |
| | | | | 223/85 |
| 8,056,988 | B2 * | 11/2011 | Pan | A47B 63/00 |
| | | | | 312/201 |
| 8,121,722 | B2 | 2/2012 | Tourdot et al. | |
| 8,251,467 | B2 * | 8/2012 | Peng | H05K 5/0234 |
| | | | | 312/351.1 |
| 8,657,391 | B2 * | 2/2014 | Simondi | A47F 7/26 |
| | | | | 312/234.1 |
| 8,823,951 | B2 | 9/2014 | Mimeault et al. | |
| 2006/0076306 | A1 | 4/2006 | Bothun et al. | |
| 2006/0231517 | A1 | 10/2006 | Bothun et al. | |
| 2014/0139080 | A1 * | 5/2014 | Pan | A47B 53/00 |
| | | | | 312/201 |
| 2019/0335899 | A1 | 11/2019 | Langbert | |

* cited by examiner

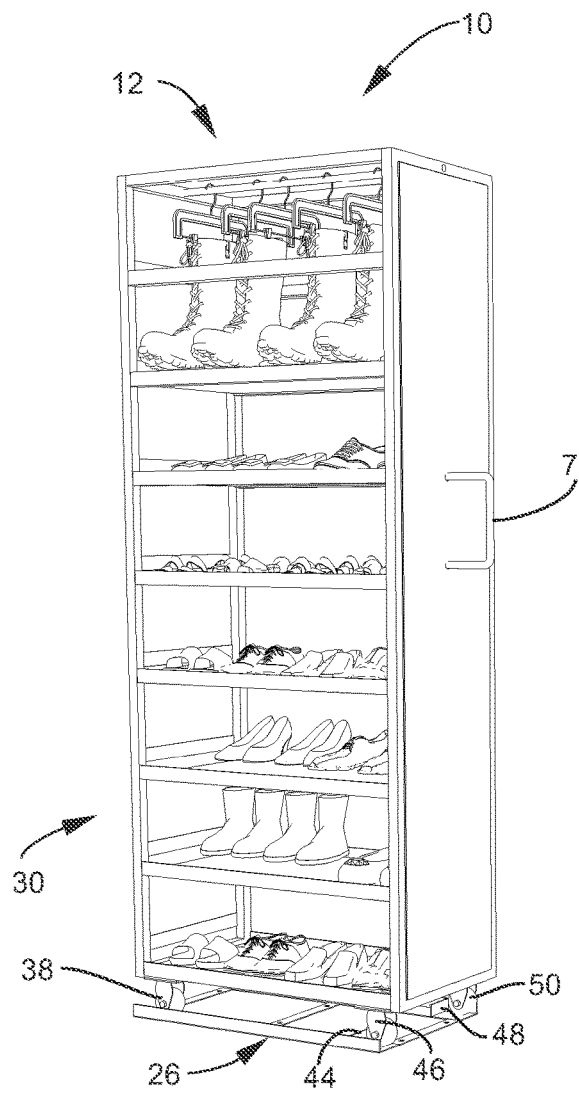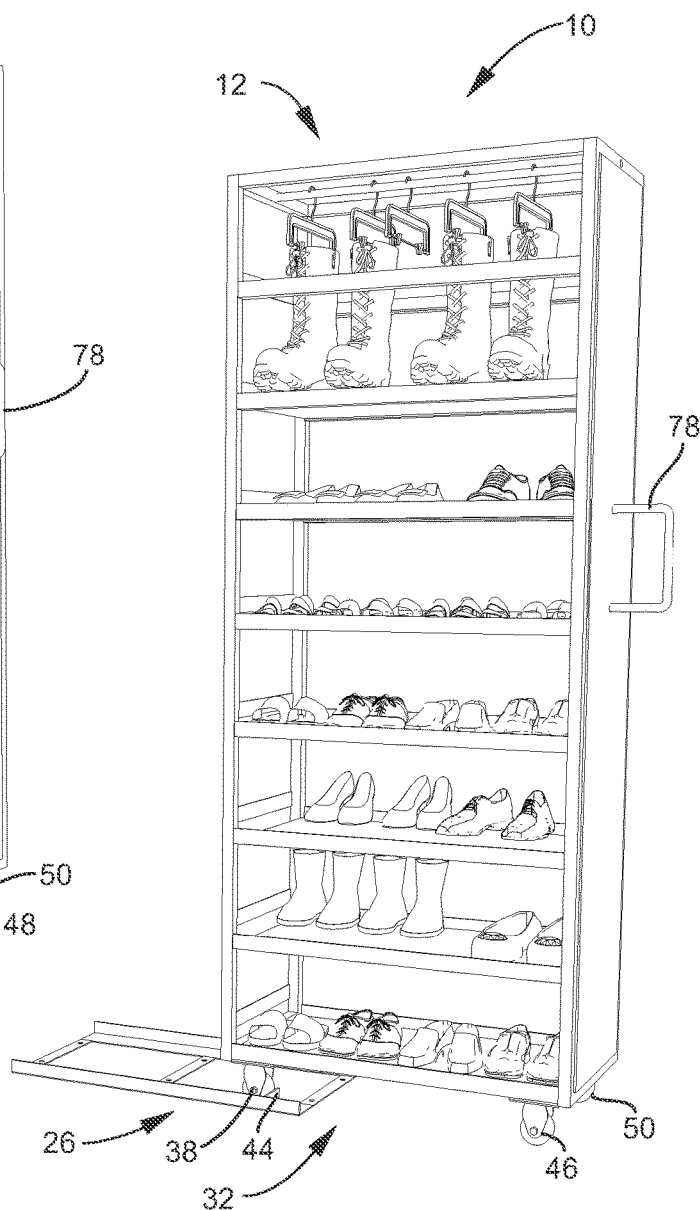
FIG. 3A
FIG. 3B

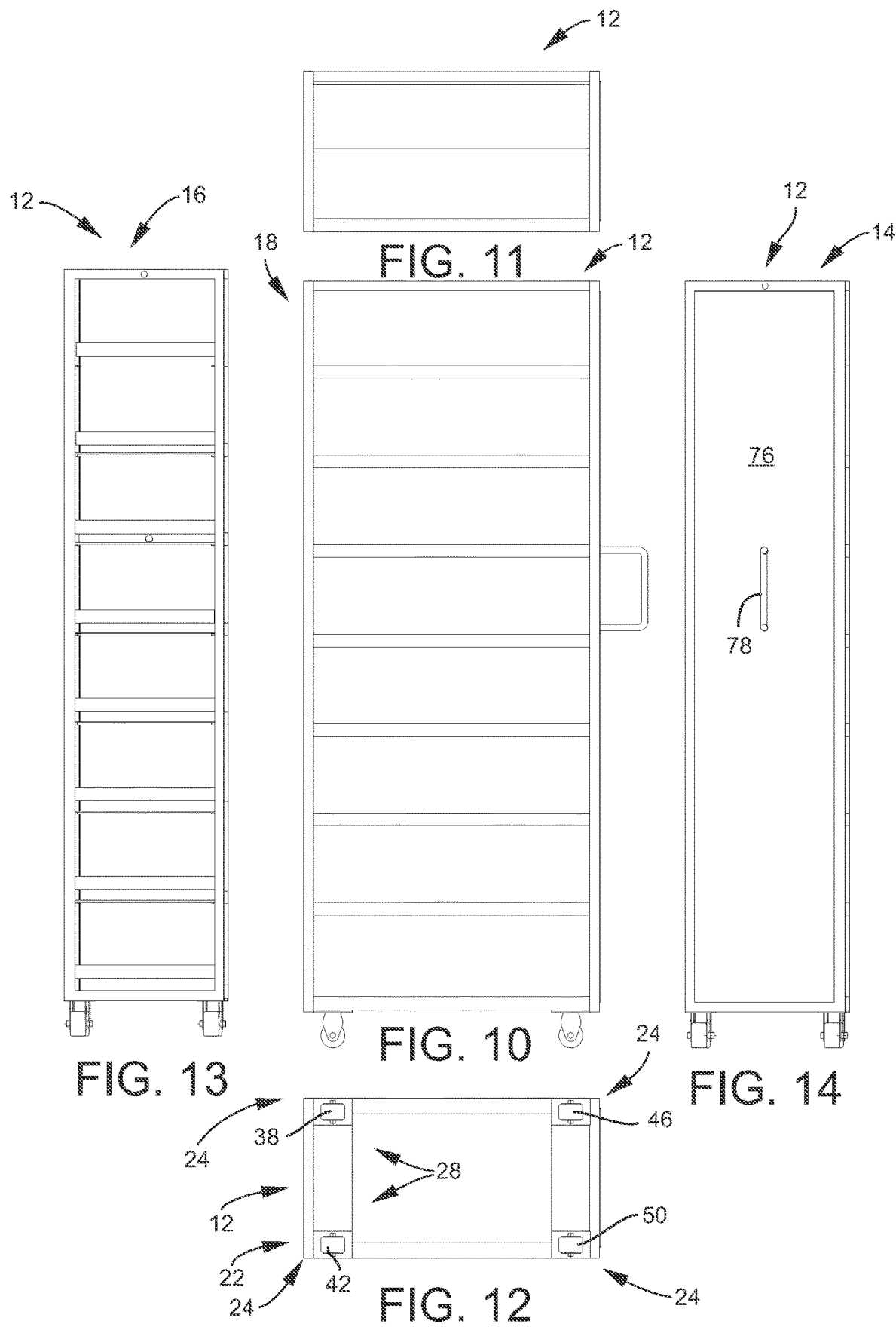

ROLLING STORAGE RACK FOR A CLOSET

CROSS-REFERENCE TO RELATED APPLICATIONS

This application claims the priority benefit of U.S. Provisional Application No. 62/863,183, filed on Jun. 18, 2019, entitled "Shoe/Clothing Storage Rolling Rack For A Closet", which is incorporated by reference herein in its entirety.

FIELD OF THE DISCLOSURE

The present disclosure relates to closet organization. Namely, the present disclosure relates to a rolling storage rack for a closet.

BACKGROUND

Generally speaking, a closet may refer to a dedicated space within a dwelling used for storage, particularly that of clothes, shoes, and/or other like items or accessories. Fitted closets are built into the walls of a house or apartment so that they take up no visible space in the room. Closets are often built under stairs, thereby using awkward space that would otherwise go unused.

Closets generally include integrated shelving that can be made from different materials with various advantages and disadvantages. Wire shelving is cheap and may be moderately difficult to install, but cannot hold much weight without giving in. Wood shelving may be more expensive and difficult to install, but is sturdier than wire. Tube shelving may be easy to install, with fewer pieces that require minimal cutting or measuring.

No matter what the closet configuration or the material used in the integrated closet shelving, most closets include a closet rod utilized for hanging clothing, jackets or the like. For example, a coat closet with a closet rod may be used to store coats, jackets, hoodies, sweatshirts, gloves, hats, scarfs, and boots/shoes. Some closets may have a mounted closet rod with dedicated open space below that can be used to store items in boxes or bins. It is very common for closets to include a top shelf for storage above the closet rod.

Regardless of the closet design or layout, the more space that is utilized within the closet the more items the closet can hold or the better the closet can be organized. Currently, closets are made with shelving or closet rods that run along the width of the closet. With this type of width wise orientation, the shelving or closet rod is designed with space between the front of the shelving or closet rods and the front of the closet to allow the user to insert and organize their shoes, clothing, accessories, other items, or the like. As such, this type of widthwise orientation of the shelving or closet rod does not take up the entire depth of the closet and thus, there is empty unutilized space at the front of the closet. Thus, there is clearly a need and/or desire to utilize this space more efficiently. In addition, closets are often left open or function as part of the decor of the home. As such, there is clearly a need and/or desire to present the area and space of the closet more attractively.

The instant disclosure may be designed to address at least certain aspects of the problems or needs discussed above by providing a rolling storage rack for a closet.

SUMMARY

The present disclosure may solve the aforementioned limitations of the currently available storage and organization devices, like closet organization devices, by providing a rolling storage rack for a closet. The rolling storage rack for a closet may generally include a base storage cart and base tracking. The base storage cart may have a front, a back, sides that are open, and wheels attached to a bottom of the base storage cart at approximately each corner on the bottom of the base storage cart. The base tracking may be configured to be mounted on a floor of the closet. The base tracking may be configured to allow each of the rear wheels of the base storage cart to roll on top of the base tracking from a stored position in the closet to an access position pulled out from the closet.

One feature of the disclosed rolling storage rack for a closet may be that when the base tracking is mounted on the floor of the closet, the base storage cart may be configured to roll from the stored position in the closet to the access position pulled out from the closet for accessing the open sides of the base storage cart for inserting, viewing and/or removing shoes, clothing or other various items Another feature of the disclosed rolling storage rack for a closet may be that when the base storage cart is rolled back and forth between the stored position in the closet and the access position pulled out from the closet, the base tracking may be configured to keep the base storage cart transversely oriented along a width of the closet.

Another feature of the disclosed rolling storage rack for a closet may be that the floor of the closet having a width, a depth and a back wall at the back side of the depth of the closet, wherein the base storage cart may be configured to roll from the access position approximate the back wall of the closet along the base tracking out of a front opening of the closet to the access position.

Another feature of the disclosed rolling storage rack for a closet may be that the base storage cart may be sized and configured to expand the depth of the closet, whereby the rolling storage rack is configured to maximize storage throughout the depth of the closet.

In select embodiments of the disclosed rolling storage rack for a closet, the base tracking may include two strips of tracking. The two strips of tracking may include at least one spacing member connecting the two strips of tracking. In select embodiments, the two strips of tracking may include a left tracking member and a right tracking member. The left tracking member may be for a left rear wheel of the base storage cart. The right tracking member may be for a right rear wheel of the base storage cart. In select example embodiments, the left tracking member and the right tracking member may be, but is not limited to, being angle iron.

In select embodiments of the disclosed rolling storage rack for a closet, the base tracking may include a left lip and/or a right lip. The left lip may be on the left tracking member. The left lip may be positioned to stop a left front wheel from rolling into the closet past the stored position in the closet. The left lip may also be positioned to stop the left rear wheel from rolling out of the closet past the access position. The right lip may be on the right tracking member. The right lip may be positioned to stop a right front wheel from rolling into the closet past the stored position in the closet. The right lip may also be positioned to stop the right rear wheel from rolling out of the closet past the access position.

In select embodiments of the disclosed rolling storage rack for a closet, the base tracking may include, but is not limited to, three spacing members. The three spacing members may be configured to connect the two strips of tracking. The three spacing members may include a front spacing member, a middle spacing member, and a rear spacing member. The front spacing member may connect a left front portion of the left tracking member with a right front portion of the right tracking member. The middle spacing member may connect a left middle portion of the left tracking member with a right middle portion of the right tracking member. The rear spacing member may connect a left rear portion of the left tracking member with a right rear portion of the right tracking member.

Another feature of the disclosed rolling storage rack for a closet may be that each of the spacing members may include a plurality of mounting holes therethrough. The mounting holes may be configured for mounting the base tracking to the floor of the closet.

In select embodiments of the disclosed rolling storage rack for a closet, the front of the base storage cart may include a panel member. The panel member may be configured to cover the front of the base storage cart. The panel member may be configured to conceal the inside of the base storage cart.

In select embodiments of the disclosed rolling storage rack for a closet, the front of the base storage cart may include a handle. The handle may be configured for manipulating the base storage cart to roll to and from the stored position and the access position.

Another feature of the disclosed rolling storage rack for a closet may be that the base storage cart can include a plurality of storage means. The plurality of storage means may be positioned between the front and the back of the base storage cart. Each of the storage means may be configured to be accessed through the open sides. In select example embodiments, and clearly not limited thereto, the plurality of storage means of the base storage cart may include a shelve or a plurality of shelves and/or a hanging rod or a plurality of hanging rods. Each of the shelves may be configured for storing shoes, clothing or other various items thereon. Each of the hanging rods may include hangers configured for hanging shoes, clothing or other various items.

As an example embodiment, and clearly not limited thereto, the plurality of storage means of the base storage cart may include eight of the shelves configured for storing the shoes, the clothing or the other various items, and one of the hanging rods with the hangers configured for hanging the shoes, the clothing or the other various items positioned at a top portion of the base storage cart. Wherein, the eight shelves may be removable, whereby, one or more of the shelves at the top may be removed for utilizing the hanging rod at the top portion of the base storage cart. In select embodiments, each of the shelves may include a flat bottom and raised edges around an entire periphery of the flat bottom. In select embodiments, the shoe hanging rod may include a circular pole connected between the front and the back from a front top support member to a back top support member, where the hanging rod may include a plurality of shoe hangers with clips sized and configured to hang shoes. In select possibly preferred embodiments, the hanging rods with shoe hangers may be sized and configured to hang boots from the circular pole.

In select embodiments of the disclosed rolling storage rack for a closet, the base storage cart may include a rigid frame. The rigid frame may be configured to support the base storage cart and the plurality of storage means of the base storage cart.

In another aspect, the instant disclosure embraces the disclosed rolling storage rack for a closet in any of the embodiments and/or combination of embodiments shown and/or described herein.

In another aspect, the instant disclosure embraces the base storage cart of the disclosed rolling storage rack for a closet alone, and/or in combination with the base tracking, and in any of the embodiments and/or combination of embodiments shown and/or described herein.

In another aspect, the instant disclosure embraces the base tracking of the disclosed rolling storage rack for a closet alone, and/or in combination with the base storage rack, and in any of the embodiments and/or combination of embodiments shown and/or described herein.

The foregoing illustrative summary, as well as other exemplary objectives and/or advantages of the disclosure, and the manner in which the same are accomplished, are further explained within the following detailed description and its accompanying drawings.

BRIEF DESCRIPTION OF THE DRAWINGS

The present disclosure will be better understood by reading the Detailed Description with reference to the accompanying drawings, which are not necessarily drawn to scale, and in which like reference numerals denote similar structure and refer to like elements throughout, and in which:

FIG. 3A is a front-left perspective view of the shoe/clothing storage rolling rack for a closet according to select embodiments of the instant disclosure with the storage rack positioned all the way on the tracks with the front wheels positioned against the front side of the track lips;

FIG. 3B is a front-left perspective view of the shoe/clothing storage rolling rack for a closet of FIG. 3A with the storage rack pulled out to the end of the tracks with the rear wheels positioned against the back side of the track lips;

FIG. 10 is a left side view of the shoe/clothing storage rolling rack for a closet of FIG. 8, where a right side view of the shoe/clothing storage rolling rack for a closet of FIG. 8 is a mirror image;

FIG. 11 is a top view of the shoe/clothing storage rolling rack for a closet of FIG. 8;

FIG. 12 is a bottom view of the shoe/clothing storage rolling rack for a closet of FIG. 8;

FIG. 13 is a back side view of the shoe/clothing storage rolling rack for a closet of FIG. 8; and FIG. 14 is a front side view of the shoe/clothing storage rolling rack for a closet of FIG. 8.

It is to be noted that the drawings presented are intended solely for the purpose of illustration and that they are, therefore, neither desired nor intended to limit the disclosure to any or all of the exact details of construction shown, except insofar as they may be deemed essential to the claimed disclosure.

DETAILED DESCRIPTION

Referring now to FIGS. 1-14, in describing the exemplary embodiments of the present disclosure, specific terminology is employed for the sake of clarity. The present disclosure, however, is not intended to be limited to the specific terminology so selected, and it is to be understood that each specific element includes all technical equivalents that operate in a similar manner to accomplish similar functions. Embodiments of the claims may, however, be embodied in many different forms and should not be construed to be limited to the embodiments set forth herein. The examples set forth herein are non-limiting examples and are merely examples among other possible examples.

Figure 1:
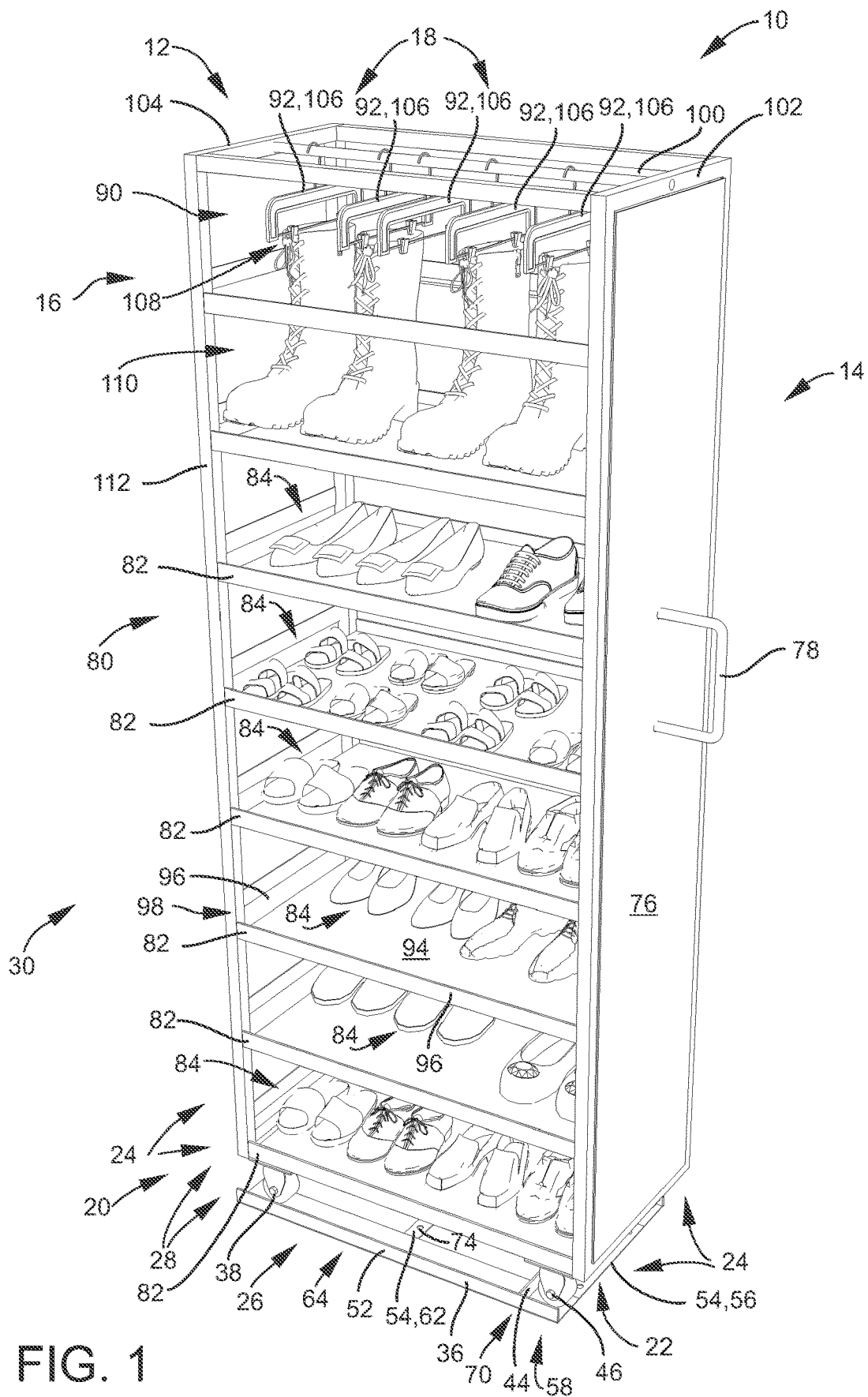
FIG. 1 is a left-front perspective view of the shoe/clothing storage rolling rack for a closet according to select embodiments of the instant disclosure.
Figure 2:
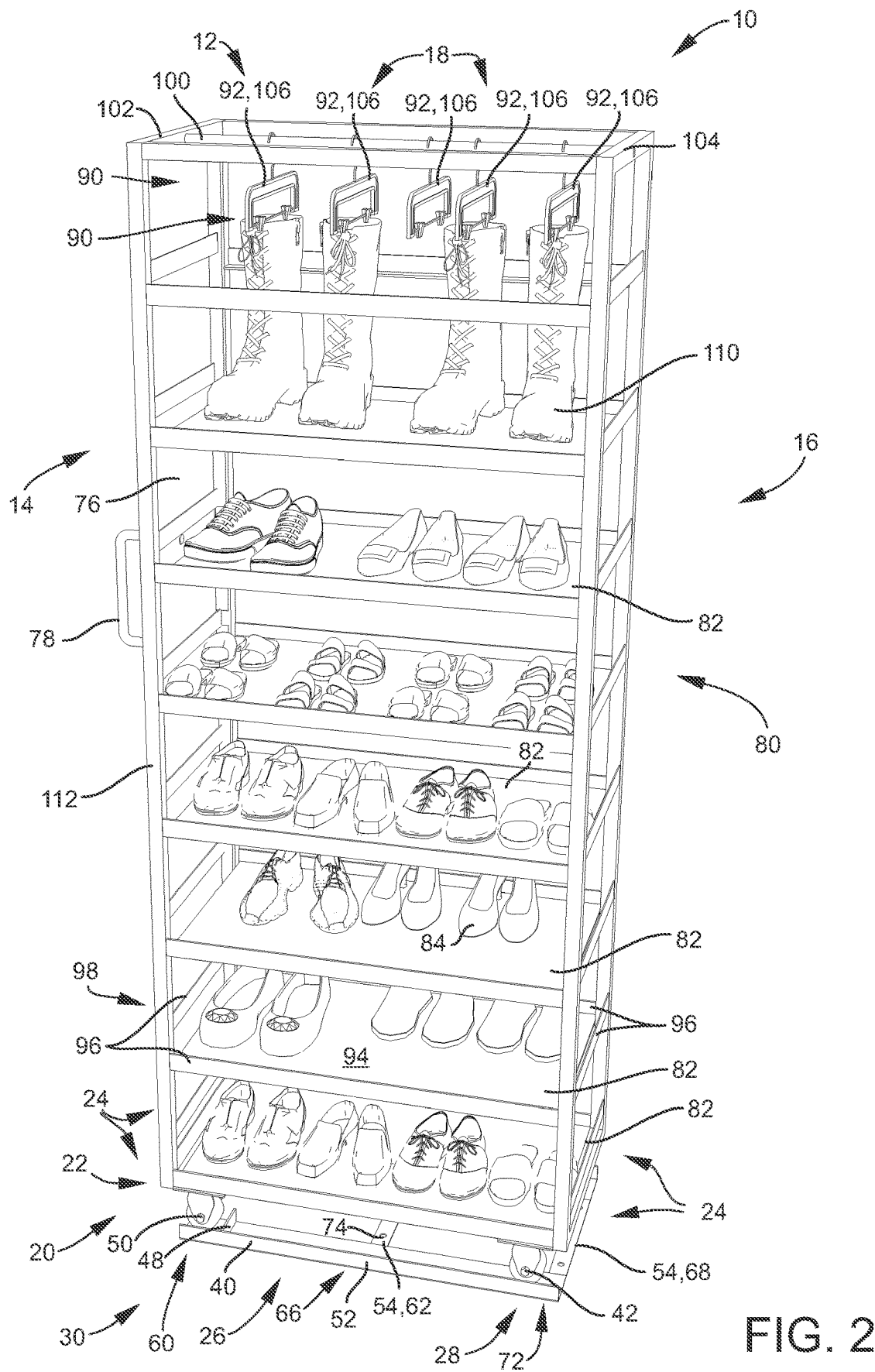
FIG. 2 is right-back perspective view of the shoe/clothing storage rolling rack for a closet of FIG. 1.
Figure 4A:
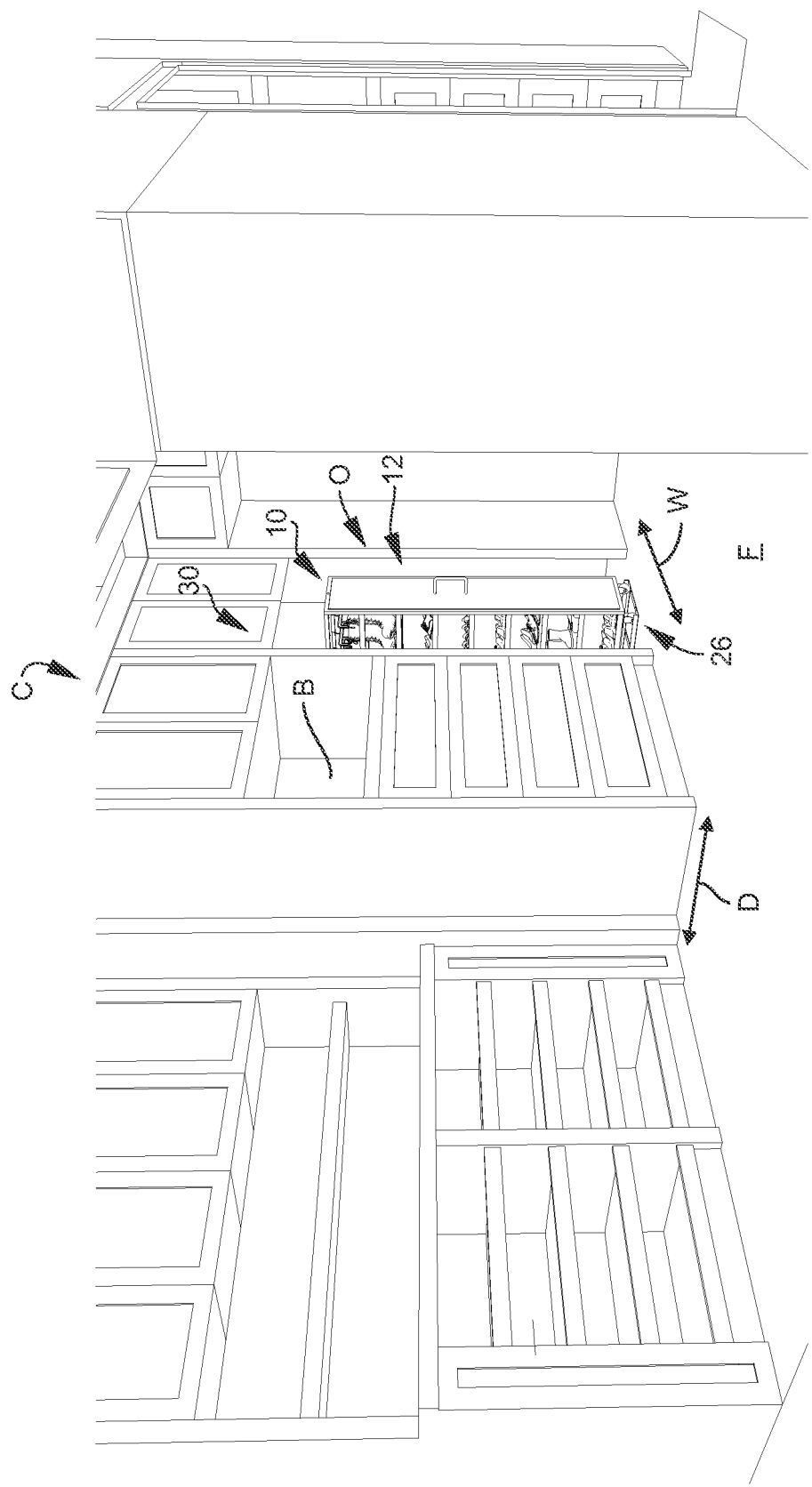
FIG. 4A is a front-left perspective environmental view of the shoe/clothing storage rolling rack for a closet according to select embodiments of the instant disclosure positioned all the way in a closet in a stored position with the storage rack positioned all the way on the tracks with the front wheels positioned against the front side of the track lips.
Figure 4B:
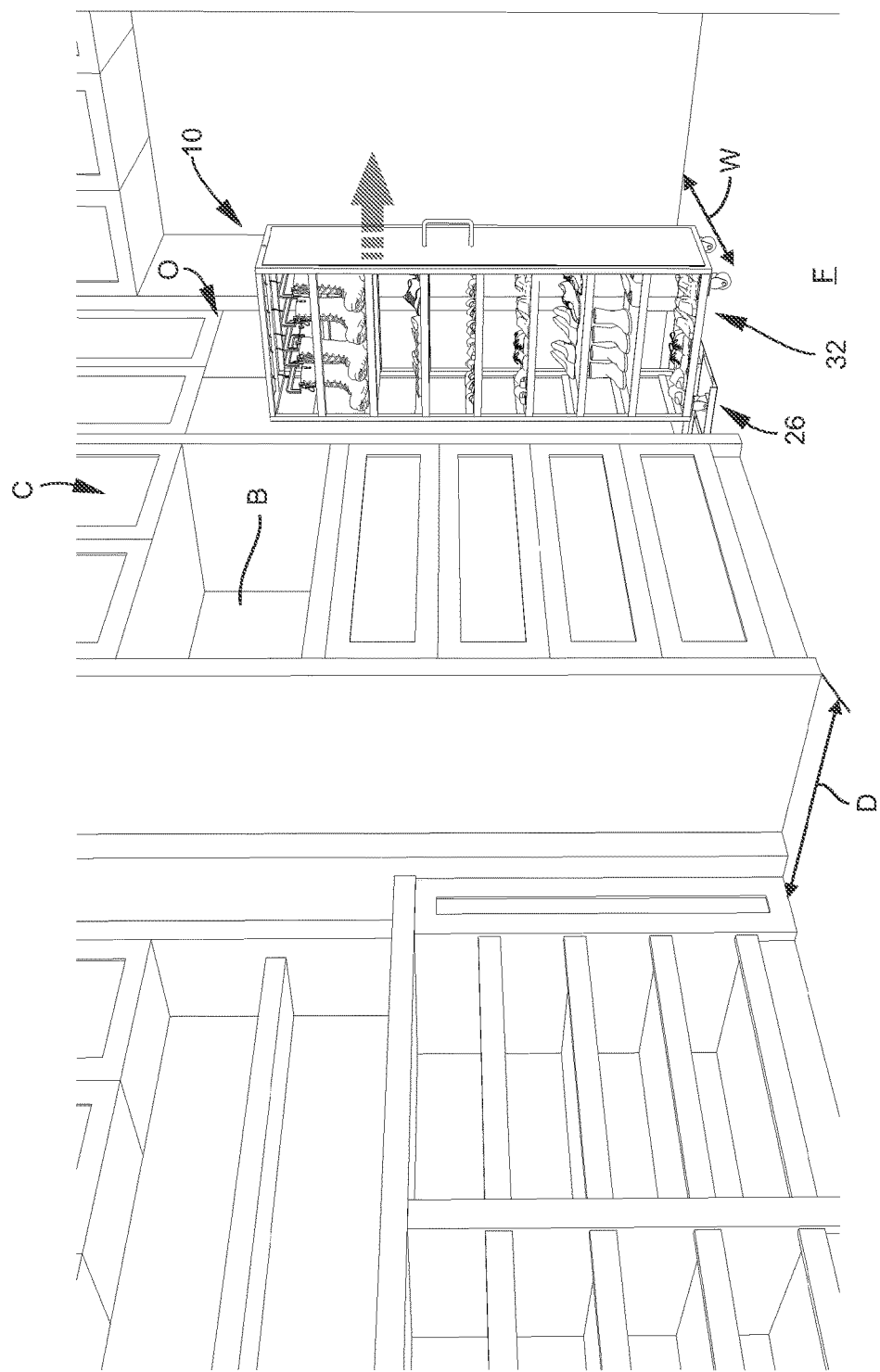
FIG. 4B is a front-left perspective environmental view of the shoe/clothing storage rolling rack for a closet of FIG. 4A pulled out of the closet in an access position with the storage rack pulled out to the end of the tracks with the rear wheels positioned against the back side of the track lips.

The present disclosure solves the aforementioned limitations of the currently available devices and methods of storage and organization by providing rolling storage rack 10 for closet C. Although rolling storage rack 10 may be designed and shown herein as for closet C, as shown in FIGS. 4A and 4B, the disclosure is not so limited, and rolling storage rack 10 may be utilized in other spaces or areas, like garages, homes, buildings, offices, restaurants, the like, etc. Rolling storage rack 10 for closet C may generally include base storage cart 12 and base tracking 26. These two components of rolling storage rack 10 may be described in greater detail below.

Base storage cart 12 may be included with rolling storage rack 10. See FIGS. 1-4 and 7-14. Base storage cart 12 may be for providing the base storage means, housing, or mechanism for storing, organizing, or the like any various shoes, clothing, accessories, the like, other various items, or combinations thereof. Base storage cart 12 may have front 14, back 16, sides 18 that are open, and wheels 20 attached to bottom 22 of base storage cart 12 at approximately each corner 24 on bottom 22 of base storage cart 12. In select embodiments, front 14 of base storage cart 12 may include panel member 76. Panel member 76 may be configured to cover front 14 of base storage cart 12. Panel member 76 may thus be configured to conceal the inside of base storage cart 12, like any shoes, clothing, accessories, other items, the like, etc. Panel member 76 may be made of any desired material and may have any desired appearance for adding to the aesthetic appearance of closet C or the like. In select embodiments, front 14 of base storage cart 12 may include handle 78. Handle 78 may be configured for manipulating base storage cart 12 to roll to and from stored position 30 and access position 32. Handle 78 may be secured to panel member 76 on front 14 of base storage cart 12 by any means, including via screws, bolts or the like through corresponding holes in panel member 76 and or rigid frame 112 of base storage cart 12.

As best shown in FIGS. 7-12, another feature of rolling storage rack 10 may be that base storage cart 12 can include plurality of storage means 80. Storage means 80 may be any devices, members, means, or mechanisms designed and/or configured to store shoes, clothing, accessories, other items, or the like inside of base storage cart 12. The plurality of storage means 80 may be positioned between front 14 and back 16 of base storage cart 12. Each storage means 80 may be configured to be accessed through one or both of open sides 18. In select example embodiments, and clearly not limited thereto, the plurality of storage means 80 of base storage cart 12 may include shelve 82 or a plurality of shelves 82 and/or hanging rod 90 or plurality of hanging rods 90. Each of the shelves 82 may be configured for storing shoes 84, clothing or other various items thereon. Each of the hanging rods 90 may include hangers 92 configured for hanging shoes 84, clothing or other various items.

As an example embodiment, and clearly not limited thereto, as shown in the Figures, the plurality of storage means 80 of base storage cart 12 may include eight of the shelves 82 configured for storing shoes 84, the clothing or the other various items, and one of hanging rods 90 with hangers 92 configured for hanging the boots 110, the clothing or the other various items positioned at a top portion of base storage cart 12. Wherein, the eight shelves 82 may be configured to be removable. Whereby, one or more of the shelves 82 at the top may be removed for utilizing hanging rod 90 at the top portion of base storage cart 12. As shown in the Figures, 2 of the eight shelves 82 were removed for utilizing hanging rod 90 at the top portion of base storage cart 12. In select embodiments, each of the shelves 82 may include flat bottom 94 and raised edges 96 around an entire periphery 98 of flat bottom 94. The raised edges may be created from angle iron members used to create rigid structure 112 of base storage cart. In select embodiments, shoe hanging rod 90 may include circular pole 100 connected between front 14 and back 16 from front top support member 102 to back top support member 104, where hanging rod 90 may include plurality of shoe hangers 106 with clips 108 sized and configured to hang shoes 84. In select possibly preferred embodiments, hanging rods 90 with shoe hangers 106 may be sized and configured to hang boots 110 from circular pole 100. However, the disclosure is not so limited and any size, shape, and or configuration of storage means 80 may be included inside of base storage cart 12. Base storage cart 12 may include rigid frame 112. Rigid frame 112 may be configured to support base storage cart 12 and any of the desired and configured plurality of storage means 80 of base storage cart 12. As shown in the Figures, in select embodiments, rigid frame 112 may be constructed of a plurality of angle irons for creating the structure or frame of base storage cart 12.

Base tracking 26 may be included with rolling storage rack 10. See FIGS. 1-6. Base tracking 26 may be for providing a track, surface, or the like for base storage cart 12 to roll on from stored position 30 to access position 32. Base tracking 26 may also be configured or sized to maintain the orientation of base storage cart 12 transverse to width W of closet C, or other like areas, so that base storage cart 12 may roll straight in and out of between stored position 30, like inside of closet C against or approximate back wall B, and access position 32, like pulled out from opening O of closet C. Base tracking 26 may be configured to be mounted on floor F of closet C, or other surfaces in other areas desired for utilizing rolling storage rack 10. As such, base tracking 26 may be configured to allow each of rear wheels 28 of base storage cart 12 to roll on top of base tracking 26 from stored position 30 in closet C to access position 32 pulled out from closet C through opening O of closet C. Base tracking 26 may generally be provided for rear wheels 28 of base storage cart 12, as rear wheels 28 may roll on base tracking 26 back and forth between stored position 30 (see FIG. 3A) and access position 32 (see FIG. 3B). In addition, base tracking 26 may provide space for the front wheels (left front wheel 46 and right front wheel 50) of base storage cart 12 to rest on when base storage cart 12 is set in stored position 30. This may help position base storage cart evenly in stored position 30 and may help protect floor F of closet C or other surfaces of other areas where rolling storage cart 10 is installed.

Base tracking 26 may be any desired shape, size or style of tracking or the like for allowing base storage cart 12 to roll to and from stored position 30 to access position 32. In select embodiments of base tracking 26 may include two strips of tracking 34. These two strips of tracking 34 may include at least one spacing member 54 connecting the two strips of tracking 34. In select embodiments, the two strips of tracking 34 may include left tracking member 36 and right tracking member 40. Left tracking member 36 may be for left rear wheel 38 of base storage cart 12. Right tracking member 40 may be for right rear wheel 42 of base storage cart 12. In select example embodiments, left tracking member 36 and right tracking member 40 may be, but are not limited to, being angle iron 52. In select embodiments, base tracking 26 may include left lip 44 and/or right li 48p. Left lip 44 may be on left tracking member 36. Left lip 44 may be positioned to stop left front wheel 46 from rolling into closet C past stored position 30 in closet C, like to prevent base storage cart 12 from hitting and damaging back wall B of closet C or the like. Left lip 44 may also be positioned to stop left rear wheel 38 from rolling out of closet C, or the like, past access position 32. However, a user could lift base storage cart 12 off of base tracking 26 and over left lip 44 and/or right lip 48 for removing base storage cart 12 from closet C completely. Right lip 48 may be on right tracking member 40. Right lip 48 may be positioned to stop right front wheel 50 from rolling into closet C past stored position 30 in closet C, like to prevent base storage cart 12 from hitting and damaging back wall B of closet C or the like. Right lip 48 may also be positioned to stop right rear wheel 42 from rolling out of closet C past access position 32. However, a user could lift base storage cart 12 off of base tracking 26 and over left lip 44 and/or right lip 48 for removing base storage cart 12 from closet C completely.

Figure 5:
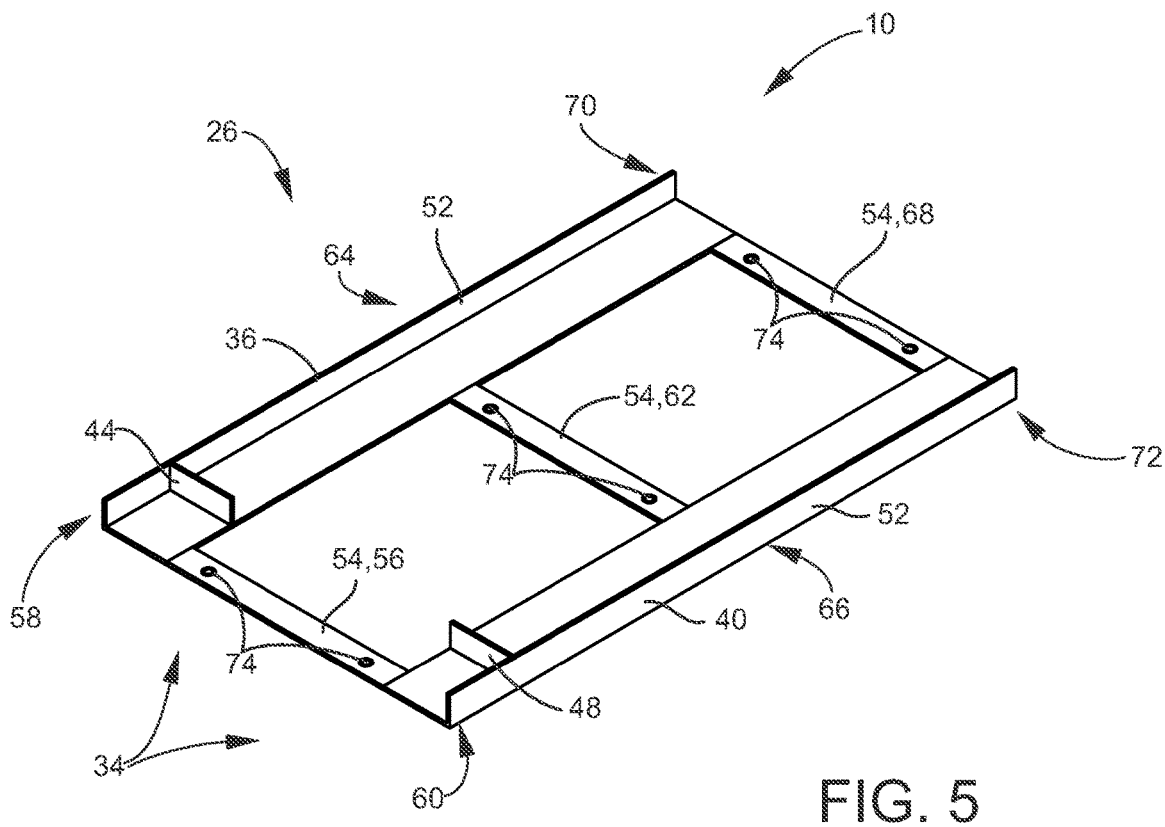
FIG. 5 is a front-right perspective view of the track for the shoe/clothing storage rolling rack for a closet according to select embodiments of the instant disclosure.
Figure 6:
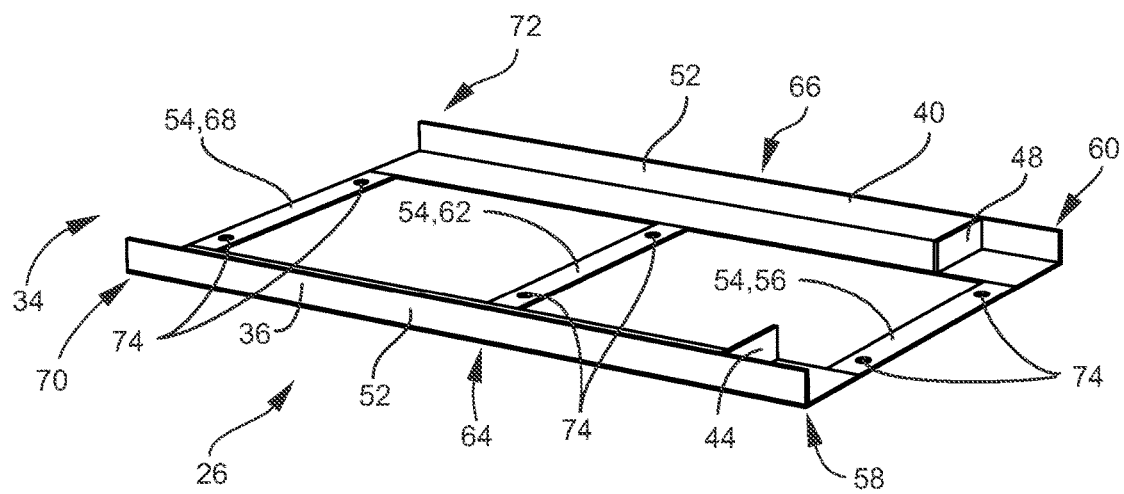
FIG. 6 is a front-left perspective view of the track of FIG. 5.

As best shown in FIGS. 5 and 6, in select embodiments of rolling storage rack 10, base tracking 26 may include, but is not limited to, three spacing members 54. The three spacing members 54 may be configured to connect the two strips of tracking 34. The three spacing members 54 may include front spacing member 56, middle spacing member 62, and rear spacing member 68. Front spacing member 56 may connect left front portion 58 of left tracking member 36 with right front portion 60 of right tracking member 40. Middle spacing member 62 may connect left middle portion 64 of left tracking member 36 with right middle portion 66 of right tracking member 40. Rear spacing member 68 may connect left rear portion 70 of left tracking member 36 with right rear portion 72 of right tracking member 40. In select embodiments, as shown in FIGS. 5 and 6, each spacing member 54 may include plurality of mounting holes 74 therethrough. However, the disclosure is not so limited to mounting holes 74 being therethrough spacing member 54, but could also or alternatively through left tracking member 36 and/or right tracking member 40. Mounting holes 74 may thus be configured for mounting base tracking 26 to floor F of closet C, or the like, like via any nails, screws, bolts, fasteners, or the like.

Referring now specifically to FIGS. 4A and 4B, one feature of rolling storage rack 10 for closet C may be that when base tracking 26 is mounted on floor F of closet C, base storage cart 12 may be configured to roll from stored position 30 (see FIG. 4A) in closet C to access position 32 (see FIG. 4B) pulled out from closet C for accessing open sides 18 of base storage cart 12 for inserting, viewing and/or removing shoes, clothing or other various items. With base tracking 26 installed or mounted on floor F of closet C, like via mounting holes 74 on spacing members 54, when base storage cart 12 is rolled back and forth between stored position 30 in closet C and access position 32 pulled out from closet C (or other desired spaces or areas), base tracking 26 may be configured to keep base storage cart 12 transversely oriented along width W of closet C. This feature may make it easier to manipulate base storage cart 12 between stored position 30 and access position 32. For example, when base tracking 26 includes left tracking member 36 made from angle iron 52 and right tracking member 40 is also made from angle iron 52, these angle irons may be oriented in mirror like orientation where the raised portions of angle iron 52 of each the left and right tracking members 36 and 40 may be configured to maintain base storage cart 12 in the direction of left and right tracking members 36 and 40, which may be installed on floor F or the like in transverse orientation to width W of closet C.

Another feature of rolling storage rack 10 for closet C may be that with floor F of closet C having width W, depth D and back wall B at the back side of depth D of closet C, base storage cart 12 may be configured to roll from access position 32 approximate back wall B of closet C along base tracking 26 out of front opening O of closet C to access position 32. In select embodiments, base storage cart 12 may be sized and configured to expand depth D of closet C, or approximate thereto, whereby rolling storage rack 10 may be configured to maximize storage throughout depth D of closet C.

In another aspect, the instant disclosure embraces the disclosed rolling storage rack for a closet in any of the embodiments and/or combination of embodiments shown and/or described herein.

In another aspect, the instant disclosure embraces the base storage cart of the disclosed rolling storage rack for a closet alone, and/or in combination with the base tracking, and in any of the embodiments and/or combination of embodiments shown and/or described herein.

In another aspect, the instant disclosure embraces the base tracking of the disclosed rolling storage rack for a closet alone, and/or in combination with the base storage rack, and in any of the embodiments and/or combination of embodiments shown and/or described herein.

In sum, rolling storage rack 10 may be designed so that a person with remedial knowledge and experience with tools can easily install it in closet C, or other desired space. It requires easy, basic assembly for the average renter or homeowner. Base tracking 26 may be attached to floor F, or other desired surface, with a drill and six screws through mounting holes 74. As such, power tools may not even be required for installation. Base storage cart 12 with wheels 20 may be placed on top of base tracking 26 for easy in and out rolling. Base storage cart 12 may be completely separate from base tracking 26 for ease of installation and ease of operation. No tracks are attached to base storage cart 12 so there is no possibility of the cart "jumping the track" or becoming "top heavy" and causing maintenance problems or hassles. A homeowner or builder can install rolling storage rack 10 into any wood or concrete floor by using the appropriate screws. When a renter or homeowner moves, s/he can easily disassemble rolling storage rack 10, unscrew base tracking 26, remove it from floor F, and take it with him/her to a new residence.

A primary feature of rolling storage cart 10 may be the amount of storage space it provides in dwellings where closet storage space is very minimal (apartments, condos, and average homes). It can also be used in garages for miscellaneous storage. This product can condense approximately 3' of closet space into 12.5". It also offers the renter/homeowner a quick glance and easy accessibility to all of his/her shoes, clothing items, or other miscellaneous items in one place.

Another feature of rolling storage cart 10 may be the ease of installation for the average renter/homeowner. It requires a remedial knowledge of tools. The only power tool necessary for installation is a basic drill. It is not a custom, built-in unit but rather a flexible unit that can easily be installed into most spaces in a closet or garage. It can also be easily removed and taken with the tenant/homeowner when s/he moves.

An additional feature of rolling storage cart 10 may be its affordability for the average DIYer. It is approximately 50% less expensive than most custom, built-in units. It offers the same space saving amenities to people who live in lower priced dwellings that many custom built homes offer, but at half the price.

Rolling storage cart 10 may be lightweight and manageable for a small person to pick up and install.

EXAMPLE

As shown in the Figures, base storage cart 12 of rolling storage rack 10 was designed with the unit having a width of 12.5" wide and a height of 56.625" tall with 7 storage shelves. It rolls out on base tracking 26 that is separate from base storage cart 12 and screwed into floor F. It has front panel member 76 and a back panel with sides 18 that are open.

As shown best in FIGS. 5 and 6, base tracking 26 may be configured for base storage cart 12 with two strips of channel tracking 34, each 2.500" wide with spacing members 54 connecting the two tracks at the top, bottom and middle, making the entire base unit 12.500" wide. The depth of the tracking is 20.250". It has 6 holes for screwing the unit into the floor of the closet.

As best shown in FIGS. 7-14, base storage cart 12 was designed with a depth of 23.250" deep and 12.500" wide. It has four casters attached to bottom 22 of the unit, see FIG. 12. When base storage cart 12 is placed on base tracking 26, the two front wheels 20 of base storage cart 12 may fall outside of the channels on the front of base storage cart 12.

Rigid frame 112 was designed with front and back supports. There are 2 such front and back supports that are 12.300" wide×56.625" tall, with one on front 14 of base storage cart 12 and one on back 16. This height will enable installation in a retrofit market where closet rods are typically 60" tall. The front and back supports may have 9 drilled holes for shelf attachments at various intervals (1.595", 7.529', 14.590", 21.650", 28.711", 35.771", 42.832", 49.893", 56.816"). There are 2 holes drilled in the middle of each of these front and back supports at 34.481" and 38.231" for pull handle 78 (12.300" long×1.000" wide) to be installed, depending on which side handle 78 is needed for a walk-in closet installation. Rigid frame 112 also includes a cap on top of base storage cart 12. The cap was designed with a width of 12.500" wide and a depth of 23.250" deep and is installed on top of the unit.

Figure 7:
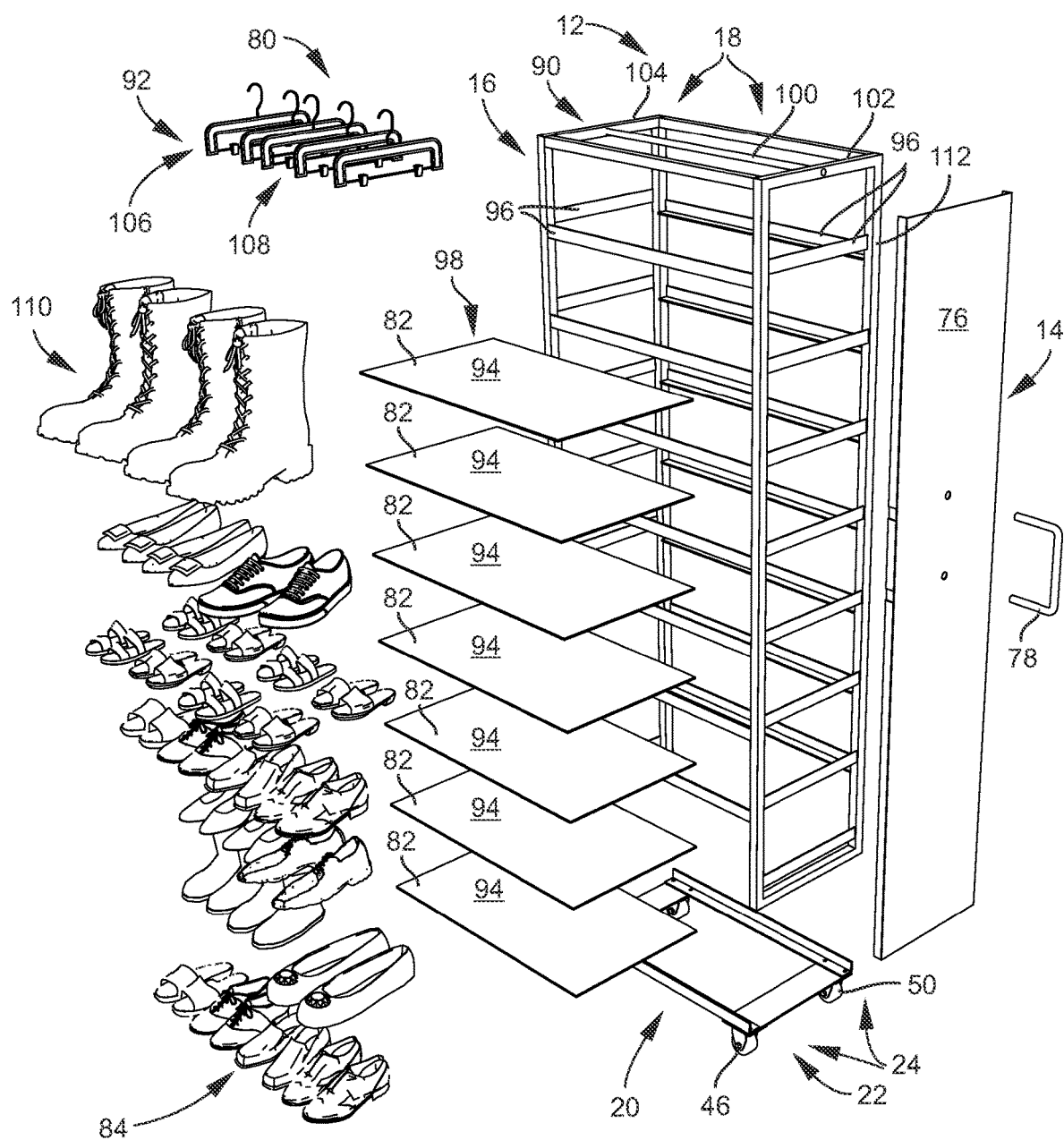
FIG. 7 is a partially disassembled front-left perspective view of the shoe/clothing storage rolling rack for a closet according to select embodiments of the instant disclosure.
Figure 8:
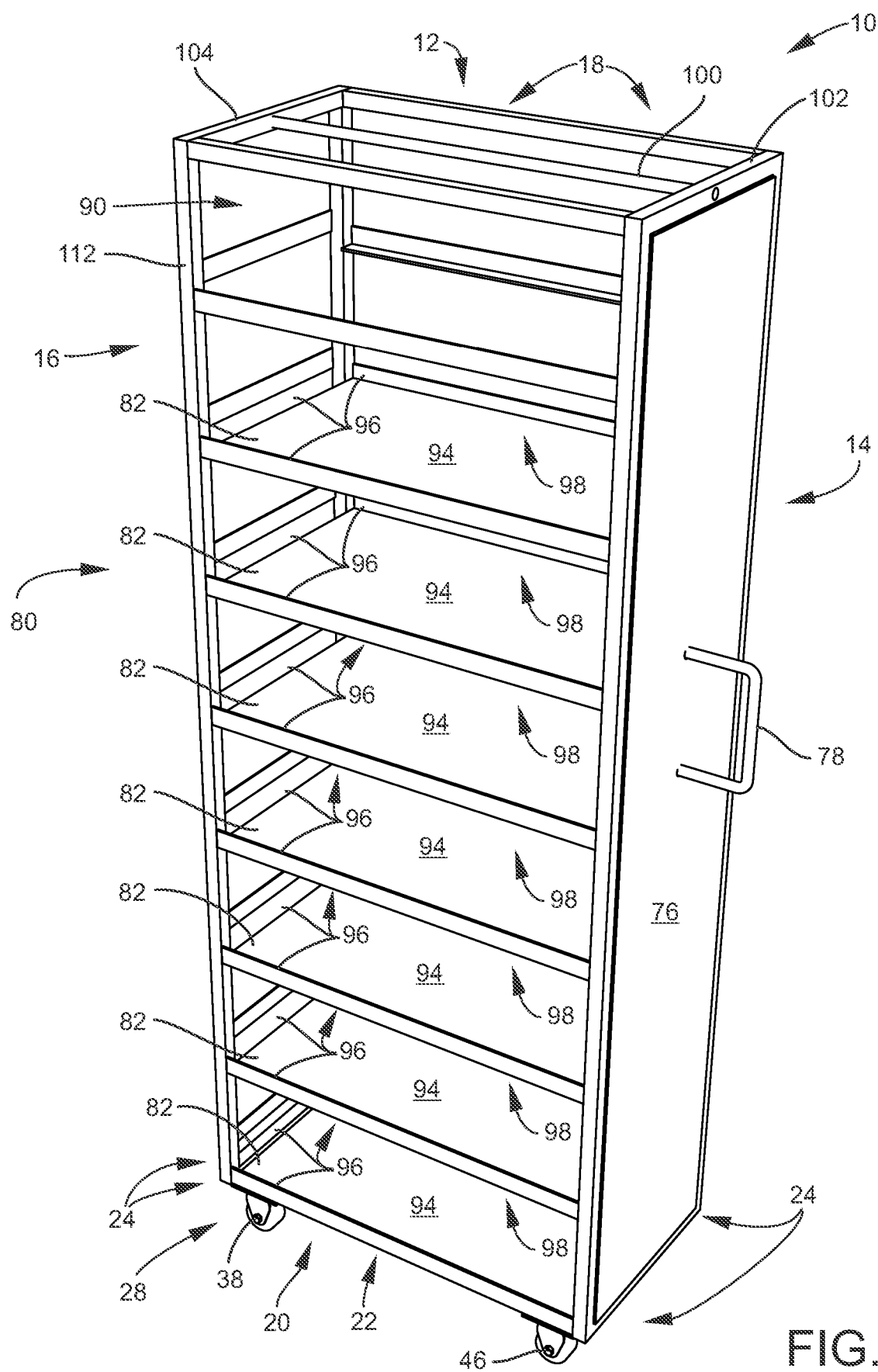
FIG. 8 is a front-left perspective view of the shoe/clothing storage rolling rack for a closet according to select embodiments of the instant disclosure.
Figure 9:
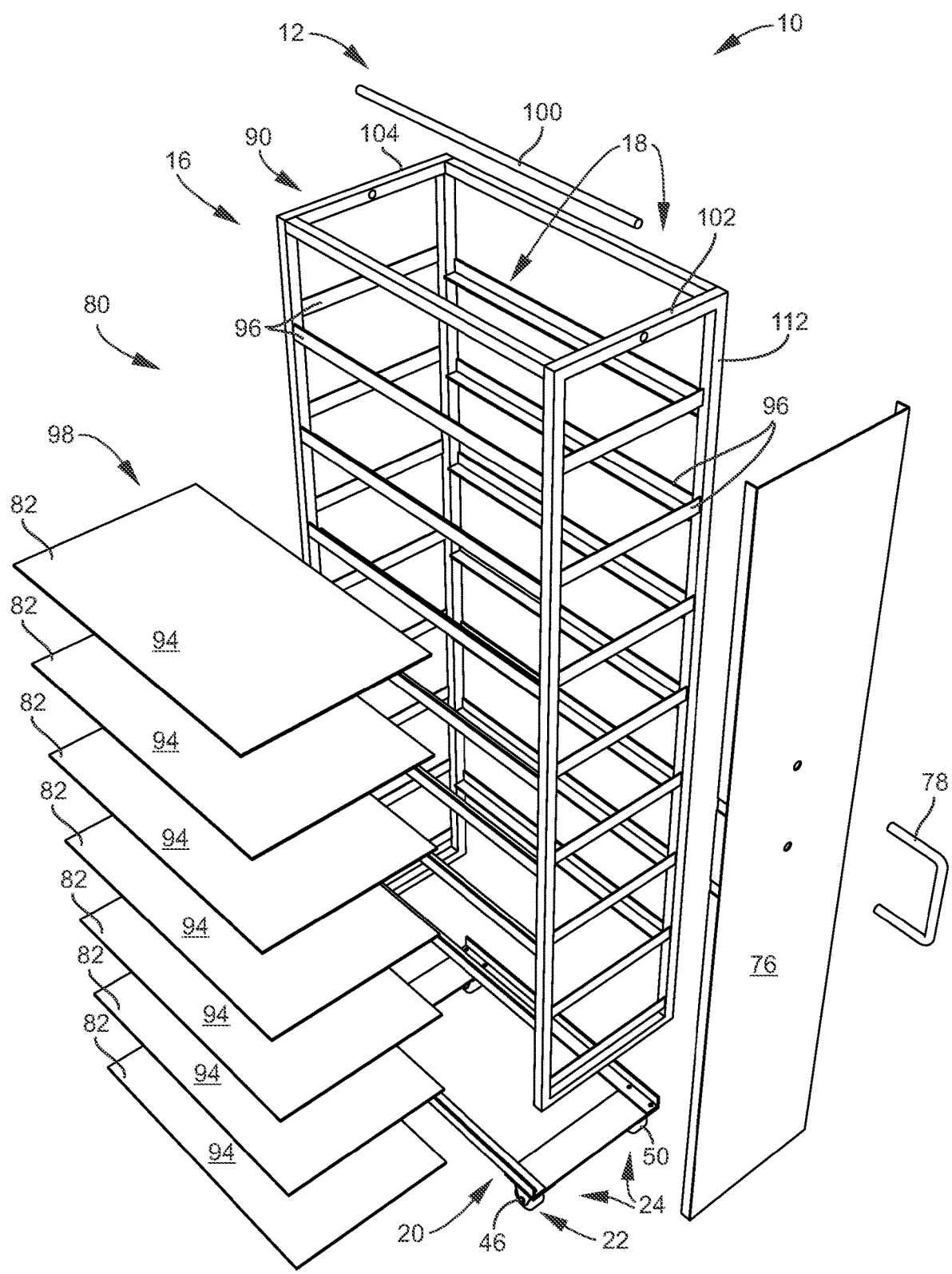
FIG. 9 is a partially disassembled front-left perspective view of the shoe/clothing storage rolling rack for a closet of FIG. 8.

As best shown in FIGS. 7 and 9, there are 7 shelves 82 on base storage cart 12. Each shelf 82 was designed to be 12.070" wide and 23.028" deep with raised edges 96 on each side of shelf 82 to secure the contents on shelf 82. Shelves 82 may be attached to the front and back supports at various intervals with cap screws.

In the specification and/or figures, typical embodiments of the disclosure have been disclosed. The present disclosure is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The foregoing description and drawings comprise illustrative embodiments. Having thus described exemplary embodiments, it should be noted by those skilled in the art that the within disclosures are exemplary only, and that various other alternatives, adaptations, and modifications may be made within the scope of the present disclosure. Merely listing or numbering the steps of a method in a certain order does not constitute any limitation on the order of the steps of that method. Many modifications and other embodiments will come to mind to one skilled in the art to which this disclosure pertains having the benefit of the teachings presented in the foregoing descriptions and the associated drawings. Although specific terms may be employed herein, they are used in a generic and descriptive sense only and not for purposes of limitation. Accordingly, the present disclosure is not limited to the specific embodiments illustrated herein but is limited only by the following claims.

The invention claimed is:

1. A closet comprising:
a width;
a depth;
a back wall at a back side of the depth of the closet;
a front opening at a front side of the depth of the closet;
a floor having the width and depth of the closet; and
a rolling storage rack for the closet comprising:
a base storage cart with a front, a back, sides that are open, and wheels attached to a bottom of the base storage cart, with a single caster wheel at approximately each corner on the bottom of the base storage cart; and
base tracking mounted on the floor of the closet, the base tracking is configured to allow at least rear wheels of the wheels of the base storage cart to roll on top of the base tracking from a stored position in the closet to an access position pulled out from the closet, wherein the base tracking consisting essentially of:
two strips of tracking including:
a left tracking member for a left rear caster wheel of the base storage cart, the left tracking member is a left angle iron, the left angle iron including a left bottom surface for the left rear caster wheel to roll on and a left vertical surface configured to keep the left rear caster wheel on the left bottom surface; and
a right tracking member for a right rear caster wheel of the base storage cart, the right tracking member is a right angle iron, the right angle iron including a right bottom surface for the right rear caster wheel to roll on and a right vertical surface configured to keep the right rear caster wheel on the right bottom surface;

the left vertical surface in combination with the right vertical surface are configured to keep the rear caster wheels on the left bottom surface and the right bottom surface, a left lip on the left tracking member, the left lip is positioned to stop a left front caster wheel from rolling into the closet past the stored position in the closet, the left lip is also positioned to stop the left rear caster wheel from rolling out of the closet past the access position;

a right lip on the right tracking member, the right lip is positioned to stop a right front caster wheel from rolling into the closet past the stored position in the closet, the right lip is also positioned to stop the right rear caster wheel from rolling out of the closet past the access position; and three spacing members connecting the two strips of tracking, the three spacing members including:

a front spacing member connecting a left front portion of the left tracking member with a right front portion of the right tracking member;

a middle spacing member connecting a left middle portion of the left tracking member with a right middle portion of the right tracking member;

a rear spacing member connecting a left rear portion of the left tracking member with a right rear portion of the right tracking member; and each of the three spacing members including a plurality of mounting holes therethrough configured for mounting the base tracking to the floor of the closet;

the base storage cart is sized and configured to expand the depth of the closet, whereby the rolling storage rack is configured to maximize storage throughout the depth of the closet;

the base storage cart rolls from the stored position in the closet approximate the back wall of the closet along the base tracking out of the front opening of the closet to the access position pulled out from the closet for accessing the sides that are open of the base storage cart for inserting, viewing and/or removing shoes, clothing or other various items, where the base tracking keeps the base storage cart transversely oriented along the width of the closet.

2. The rolling storage rack for a closet of claim 1, wherein the front of the base storage cart including:

a panel member covering the front of the base storage cart and configured to conceal the inside of the base storage cart; and a handle configured for manipulating the base storage cart to roll to and from the stored position and the access position.

3. The rolling storage rack for a closet of claim 1, wherein the base storage cart including a plurality of storage means between the front and the back of the base storage cart, wherein the storage means are configured to be accessed through the sides that are open.

4. The rolling storage rack for a closet of claim 3, wherein the plurality of storage means of the base storage cart is selected from a group consisting of:

a shelve configured for storing shoes, clothing or other various items;

a hanging rod with hangers configured for hanging the shoes, the clothing or the other various items; and combinations thereof.

5. The rolling storage rack for a closet of claim 4, wherein the plurality of storage means of the base storage cart including:

eight of the shelves configured for storing the shoes, the clothing or the other various items; and one of the hanging rods with the hangers configured for hanging the shoes, the clothing or the other various items positioned at a top portion of the base storage cart;

wherein, the eight shelves are configured to be removable, whereby, the hanging rod is configured to be usable when one or more of the eight shelves near the top portion are removed.

6. The rolling storage rack for a closet of claim 5, wherein:

each of the shelves including a flat bottom and raised edges around an entire periphery of the flat bottom; and the hanging rod including:

a circular pole connected between the front and the back from a front top support member to a back top support member; and the hanging rod including a plurality of shoe hangers with clips sized and configured to hang the shoes.

7. The rolling storage rack for a closet of claim 6, wherein the shoe hangers for the hanging rod are sized and configured to hang boots from the circular pole.

8. The rolling storage rack for a closet of claim 3, wherein the base storage cart including a rigid frame configured to support the base storage cart and the plurality of storage means of the base storage cart.

9. A closet comprising:

a width;

a depth;

a back wall at a back side of the depth of the closet;

a front opening at a front side of the depth of the closet;

a floor having the width and depth of the closet; and a rolling storage rack for the closet comprising:

a base storage cart with a front, a back, sides that are open, and wheels attached to a bottom of the base storage cart at approximately each corner on the bottom of the base storage cart, wherein:

the front of the base storage cart including:

a panel member covering the front of the base storage cart and configured to conceal the inside of the base storage cart; and a handle configured for manipulating the base storage cart to roll to and from a stored position and an access position;

the base storage cart including a plurality of storage means between the front and the back of the base storage cart, wherein the storage means are configured to be accessed through the sides that are open, the plurality of storage means of the base storage cart is selected from a group consisting of:

a shelve configured for storing shoes, clothing or other various items;

a hanging rod with hangers configured for hanging the shoes, the clothing or the other various items; and combinations thereof; and the base storage cart including a rigid frame configured to support the base storage cart and the plurality of storage means of the base storage cart;

base tracking configured to be mounted on the floor of the closet, the base tracking is configured to allow at least rear wheels of the wheels of the base storage cart to roll on top of the base tracking from the stored position in the closet to the access position pulled out from the closet, the base tracking consisting essentially of two strips of tracking with three spacing members connecting the two strips of tracking, wherein the two strips of tracking including:
a left tracking member for a left rear wheel of the base storage cart; and
a right tracking member for a right rear wheel of the base storage cart;
the left tracking member and the right tracking member is angle iron;
a left lip on the left tracking member, the left lip is positioned to stop a left front wheel from rolling into the closet past the stored position in the closet, the left lip is also positioned to stop the left rear wheel from rolling out of the closet past the access position; and
a right lip on the right tracking member, the right lip is positioned to stop a right front wheel from rolling into the closet past the stored position in the closet, the right lip is also positioned to stop the right rear wheel from rolling out of the closet past the access position;
the three spacing members connect the two strips of tracking, the three spacing members including:
a front spacing member connecting a left front portion of the left tracking member with a right front portion of the right tracking member;
a middle spacing member connecting a left middle portion of the left tracking member with a right middle portion of the right tracking member; and
a rear spacing member connecting a left rear portion of the left tracking member with a right rear portion of the right tracking member;
each of the three spacing members including a plurality of mounting holes therethrough configured for mounting the base tracking to the floor of the closet;
the base tracking is mounted on the floor of the closet, the base storage cart rolls from the stored position in the closet against the back wall of the closet along the base tracking out of the front opening of the closet to the access position pulled out from the closet for accessing the sides that are open of the base storage cart for inserting, viewing and/or removing the shoes, the clothing or the other various items, where the base tracking keeps the base storage cart transversely oriented along the width of the closet;
wherein the base storage cart is sized and configured to expand the depth of the closet, whereby the rolling storage rack is configured to maximize storage throughout the depth of the closet.

\* \* \* \* \*